US011543802B2

(12) United States Patent
Weinberg

(10) Patent No.: US 11,543,802 B2
(45) Date of Patent: Jan. 3, 2023

(54) MULTI-SOURCE ITEM CREATION SYSTEM

(71) Applicant: Etsy, Inc., Brooklyn, NY (US)

(72) Inventor: Alex Weinberg, Brooklyn, NY (US)

(73) Assignee: Etsy, Inc., Brooklyn, NY (US)

(*) Notice: Subject to any disclaimer, the term of this patent is extended or adjusted under 35 U.S.C. 154(b) by 90 days.

(21) Appl. No.: 17/132,502

(22) Filed: Dec. 23, 2020

(65) Prior Publication Data

US 2022/0197248 A1   Jun. 23, 2022

(51) Int. Cl.
*G05B 19/418* (2006.01)
*G06N 20/00* (2019.01)

(52) U.S. Cl.
CPC ........... *G05B 19/418* (2013.01); *G06N 20/00* (2019.01); *G05B 2219/31372* (2013.01)

(58) Field of Classification Search
None
See application file for complete search history.

(56) References Cited

U.S. PATENT DOCUMENTS

| | | | | |
|---|---|---|---|---|
| 9,679,423 | B2 * | 6/2017 | McGinnis | G06Q 10/1095 |
| 2017/0068121 | A1 * | 3/2017 | Fonte | H04L 65/403 |
| 2018/0053142 | A1 * | 2/2018 | Martin | G06N 20/00 |
| 2020/0104036 | A1 * | 4/2020 | Harrison | G06T 19/006 |
| 2020/0272135 | A1 * | 8/2020 | Lake | H04W 4/50 |

OTHER PUBLICATIONS

Lu et al., "ManuService ontology: a product data model for service-oriented business interactions in a cloud manufacturing environment," Springer, 2016, 19pg. (Year: 2016).*
Monostori et al., "Cyber-physical systems in manufacturing," CIRP, 2016, 29pg. (Year: 2016).*

* cited by examiner

*Primary Examiner* — Ryan D. Coyer
(74) *Attorney, Agent, or Firm* — Fish & Richardson P.C.

(57) ABSTRACT

Methods, systems, and computer readable medium for a multi-source item creation system. The method includes receiving, through a user interface and from a requesting member of a digital platform, manufacturing parameters for an item to be manufactured, dynamically altering the user interface based on the manufacturing parameters to include different user interface elements that correspond to a subset of attributes, determining, based on interaction with the different user interface elements, additional manufacturing parameters, generating, using one or more machine learning models, a set of manufacturers based on the manufacturing parameters and the additional manufacturing parameters, wherein the one or more machine learning models have been trained to generate the set of manufacturers based on a level of uniqueness of the item to be manufactured and characteristics of the manufacturers, and returning, to the requesting member, a subset of the set of manufacturers.

20 Claims, 7 Drawing Sheets

MULTI-SOURCE ITEM CREATION SYSTEM

BACKGROUND

This document relates to creating items based on input from multiple sources.

Physical products can be produced with various different attributes. For example, physical products can vary in their shape, size, color, texture, or in other ways. These attributes are used by manufacturers to create the products.

SUMMARY

In general, one innovative aspect of the subject matter described in this specification can be embodied in a method that includes receiving, through a user interface and from a requesting member of a digital platform, first manufacturing parameters for an item to be manufactured, dynamically altering the user interface based on the first manufacturing parameters to include different user interface elements that correspond to a subset of attributes that are available when the item has the first manufacturing parameters, wherein the subset of attributes is fewer than all available attributes, determining, based on interaction with the different user interface elements, additional manufacturing parameters for the product to be manufactured, generating, using one or more machine learning models, a set of manufacturers based on the first manufacturing parameters and the additional manufacturing parameters, wherein the one or more machine learning models have been trained to generate the set of manufacturers based on a level of uniqueness of the item to be manufactured and characteristics of the manufacturers, and returning, to the requesting member, a subset of the set of manufacturers that match the first manufacturing parameters and the additional manufacturing parameters, the subset having a number of manufacturers determined based on (i) the level of uniqueness of the item, (ii) a level of matching between the characteristics of the manufacturers and the first manufacturing parameters and the additional manufacturing parameters for each of the manufacturers, and (iii) a total number of manufacturers that match the first manufacturing parameters and the additional manufacturing parameters.

These and other embodiments can each optionally include one or more of the following features. The method can include receiving data indicating an interaction that adjusts one or more characteristics of the item, by the requesting member and with a model of the product to be manufactured, through an augmented reality user interface, generating, based on the received data, an updated set of one or more manufacturing parameters for the item, and providing, to the manufacturer, the updated set of one or more manufacturing parameters for the item. In some implementations, the updated set of one or more manufacturing parameters for the item includes a manufacturing diagram. In some implementations, generating the updated set of one or more manufacturing parameters for the item comprises one of adding a new manufacturing parameter for the item or removing a manufacturing parameter from the first manufacturing parameters or the additional manufacturing parameters.

In some implementations, determining additional manufacturing parameters for the product to be manufactured comprises automatically selecting values for the additional manufacturing parameters for the product.

In some implementations, the method includes receiving, through the user interface and from the requesting member, preference data indicating the requesting member's preferences of the importance of at least one parameter from the first manufacturing parameters and the additional manufacturing parameters, and weighting, based on the received preference data, the first manufacturing parameters and the additional manufacturing parameters as input to the one or more machine learning models. In some implementations, weighting the first manufacturing parameters and the additional manufacturing parameters includes determining, based on the received preference data, that the received preference data indicates the requesting member's preferences of the importance of fewer than all of the first manufacturing parameters and the additional manufacturing parameters, and in response to the determination that the received preference data indicates the requesting member's preferences of the importance of fewer than all of the first manufacturing parameters and the additional manufacturing parameters, generating, based on historical user interaction data, a weight for each parameter of the first manufacturing parameters and the additional manufacturing parameters.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. The techniques described throughout this document can lead to production of physical products, which can also be referred to as goods, based on input from multiple different sources (e.g., a manufacturer, a product requestor, and/or product designer). These techniques facilitate co-creation of products by allowing product designers (e.g., users requesting a product) to collaborate, by way of a collaboration platform, with experienced and qualified product manufacturers who are best suited to executing the product requestor/designers' visions for the products. In addition to matching a product designer with an array of qualified product manufacturers from which the designer can select a partner, the techniques allow the designer to provide input regarding the manufacturing of their product through an interactive process. The techniques also guide the input requested from the requestor and can suggest changes to attributes of a product and the marketing of the product. The suggestions can be based on feedback provided by a user (e.g., product requestor or buyer) through a feedback loop of a digital platform, which accepts, through the feedback loop, information such as how well suited each particular product is to users or for certain tasks, an overall level of user satisfaction with the particular products, and/or manufacturing feasibility of the product's design, among other information. These techniques can be implemented using a system that monitors changes to products, user feedback, etc., to provide recommendations to designers and manufacturers of products based on empirical data.

The system implementing these techniques conserves resources by matching requesting members ("r-members") of a digital platform with manufacturing members ("m-members") of the platform who are skilled and experienced in creating products similar to the particular product. For example, a user of a digital platform who wishes to have a product manufactured or otherwise created can request to be matched with a manufacturer on digital platform 130. By matching the m-members who are qualified and meet criteria specified by the requestor, the techniques can optimize the distance that the product must travel (e.g., to reach the r-member), the amount of material needed, and/or batch size of the product, among other parameters to efficiently create the product. The system applies machine learning to narrow and refine a list of qualified manufacturers (e.g., m-members) for a particular product to be made, and can provide recommendations for further input requested from a product requestor (e.g., r-member), changes to the physical attributes of the product, or ways to package, ship, and/or market the product. This allows product requestors (e.g., r-members) and manufacturers (e.g., m-members) to connect and adapt their production process to most efficiently meet consumer needs/desires for goods having specific physical attributes. R-members can, for example, be users of a digital platform who search for a particular item to obtain from m-members. R-members can be individuals who are obtaining a product for themselves or someone else, or product designers who design products and later provide the products to third parties. M-members can be, for example, individuals (or companies) who distribute products on a digital platform. In some implementations, m-members design the products, and r-members are matched with the m-member who has designed a product that most closely matches the r-member's specifications. In some situations, the system that implements the techniques discussed in this document can be in communication with a selected manufacturing facility or contact for the manufacturer and transmit a message that communicates the suggested changes, or other information, and/or initiate changes that cause the manufacturing facility to produce products having the suggested physical attributes, e.g., by modifying a state of manufacturing equipment.

The system implementing the techniques described in this document provides an intuitive process for item designers and manufacturers to collaborate. By prompting users for information that is tailored to the production area in which they operate, the system streamlines the initial input and subsequent feedback process, and allows designers to be involved in an interactive system that allows requestors to be involved and provide input prior to delivery of the finished product.

The systems and methods discussed throughout this document enable augmented reality visualization of a product, the ability to modify features of the product through interaction with the augmented reality visualization, and submission of feedback and/or feature change requests through interaction with the augmented reality visualization.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
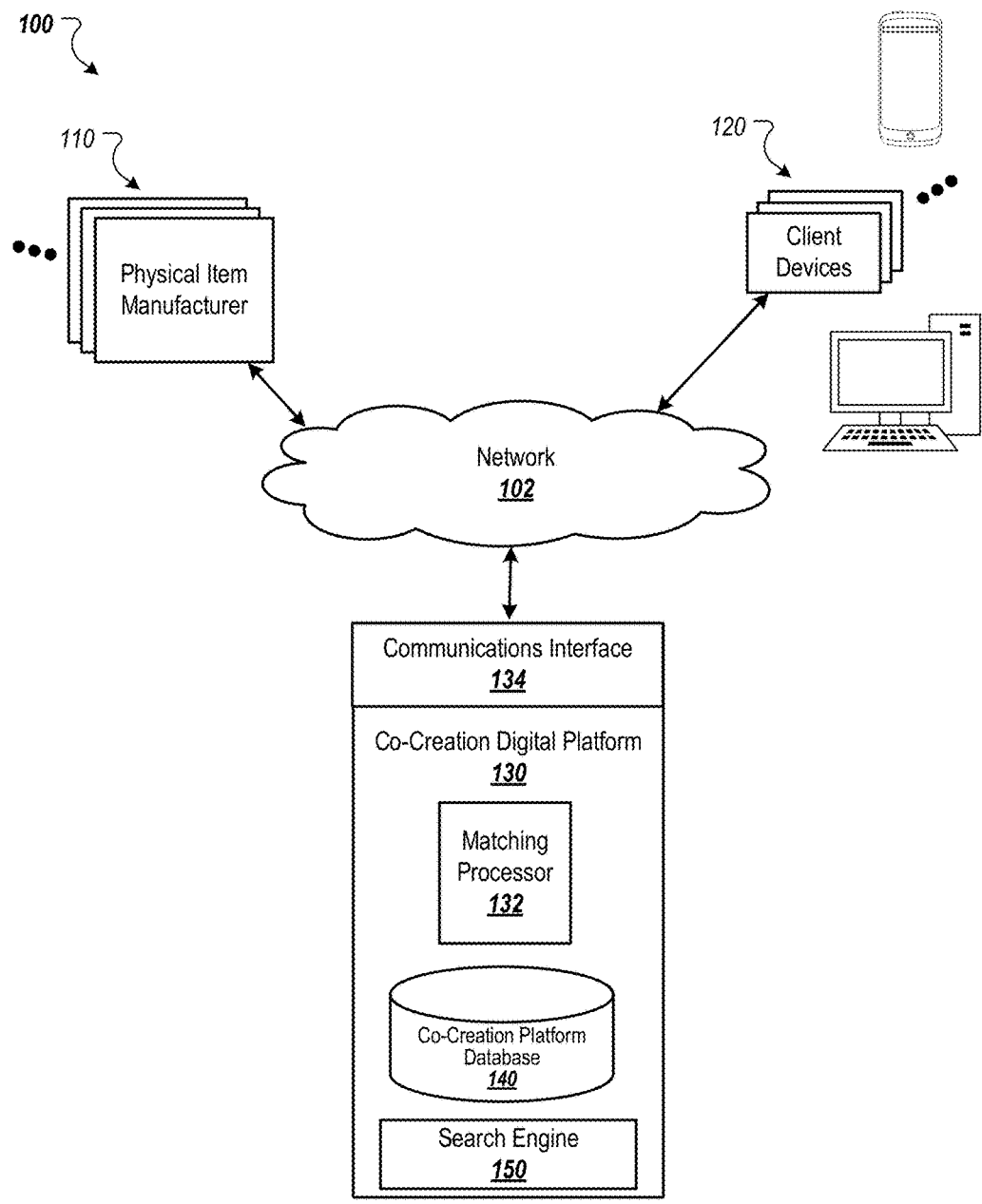
FIG. 1 is a block diagram of an example digital platform environment through which a co-creation system is implemented.

This document describes methods, systems, and devices that facilitate the co-creation of physical items. In some implementations, the items can be digital, such as a digital icon, a set of code (e.g., a photo filter or template for a website), or a digital download that can be printed (e.g., a photo design, a design that can be printed or manufactured using a 3-D printer, a water-jet, a router, etc.), among other items that are designed by a user or manufactured by a manufacturer.

In some implementations, the system can provide recommendation services across different types of distribution functionalities, such as search tags, completed transactions, item interactions, etc. The system can implement statistical testing through, for example, A/B test recommendation services.

Digital platforms provide access to physical item host distributor members, or users, that produce/distribute a wide variety of physical items. These items can differ in attributes such as category, material, style, color, composition, and other physical characteristics, and are often produced by a manufacturer. Many items are bespoke, and therefore can be modified by the user or manufacturer. To better match users with manufacturers having expertise and/or resources with respect to a physical item to be produced, the system develops machine learning models that intelligently match users with manufacturers. The system can train the models on activity or interaction data, such as the unit required amount for the items, the material needed, the location of the user, or any other metric received by the digital platform with sufficient instances to train a model. Such models may output a modified list of available, qualified manufacturers if certain design modifications are made by the user. The number of manufacturers returned to the user from which the user can select a manufacturing partner can scale based on the number of available, qualified manufacturers and the nature of the project. The models may be linear, for ease of interpretability, or based on optimizing a nonlinear function based on the starting point (such as the original physical item attributes provided by the user) subject to a distance constraint. The system can output a list of suitable manufacturers, output manufacturing parameters for a physical item based on a user's input and/or changes, and facilitate a feedback process between a user and a manufacturer. In some implementations, the system can provide the manufacturer with a proposed design (e.g., physical manufacturing plan).

Note that the techniques described in this document can also be implemented in situations where a user is browsing through available applications (e.g., in an online shopping platform or a web browser) or in other environments (e.g., on user-owned webpages). For brevity, much of the description that follows will refer to the shopping platform environment.

The proposed method includes receiving input of manufacturing parameters from a user for a product to be manufactured or otherwise created. The method includes determining, based on the input of manufacturing parameters, further parameters to request as input from the user. For example, as a user enters more parameters regarding the product, manufacturing process, materials, etc., the method can determine further parameters to request from the user, such as the grade of material to use. The method can include suggesting values for the parameters based on historical interactions between other users and similar products. The method can then use the input from the user to find a set of manufacturers who match the specified parameters. Based on the number of manufacturers in the set, the method can implement a sliding scale for a number of manufacturers to select a subset of the set of manufacturers to return to the user.

Machine learning models can be used to analyze and improve suggestions for input requested from users and matching users and manufacturers. In some cases, the models can be applied to the proposed method to improve suggestions for further input to request from a user. The models can be used to improve the narrowing process when selecting matching manufacturers.

In some situations, the models can be trained based on historical activity of users, and then used to predict the attributes most likely to be requested by the user for the item currently being requested, e.g., by inputting attributes of items previously requested by the user. The attributes that are most likely to be requested by the user, as output by the model, can be suggested to the user, and the user's selections can be used to inform the suggestion of manufacturers who have demonstrated the ability to produce items having those attributes (e.g., by having created items with those attributes or having the ability to create items having the selected attributes).

The proposed method can be implemented in the form of a user interface for a co-creation platform that enables collaboration between the user and manufacturers throughout the design and manufacturing process. In some implementations, the proposed method can include accepting and receiving input from a user through an augmented reality user interface (AR interface). For example, a user can interact with a model of a requested product for manufacturing by the manufacturer to alter manufacturing parameters of the model to provide feedback to the manufacturer. In a specific example, the AR interface can enable the user to visualize the requested item, as currently specified, in a room of their choice (or on their body in the case of clothing, jewelry, or other wearables), manipulate attributes of the item (e.g., size, color, ornamental details, etc.), and then submit the changed attributes to the manufacturer. The system can use the changed attributes to generate a work order, or instructions, for creating the item according to the changed attributes, automatically source materials required to create the item, generate CAD documents of the item, and/or initiate production of the item according to the changed attributes.

FIG. 1 is a block diagram of an example environment 100 for providing physical items through a digital platform. The example environment 100 includes a network 102, such as a local area network (LAN), a wide area network (WAN), the Internet, or a combination thereof. Network 102 connects physical item manufacturer 110, client devices 120, and co-creation digital platform 130 (also referred to as a digital platform). The example environment 100 may include many different physical item manufacturers 110 and client devices 120.

Physical item manufacturer 110, or manufacturer 110, can be, for example, a manufacturer, a company, a store, etc., that produces the physical items presented on digital platform 130. Manufacturer 110 can provide selected physical items that are requested through digital platform 130 to a requesting user, either by manufacturing the selected physical items, or by sourcing the physical item from a separate manufacturer. For example, manufacturer 110 can be a private user who manufactures and designs mugs, and provides the mugs to users who distribute mugs through digital platform 130.

A client device 120 is an electronic device that is capable of requesting and receiving resources over network 102. Example client devices 120 include personal computers, mobile communication devices, and other devices that can send and receive data over network 102. A client device 120 typically includes a user application, such as a web browser, to facilitate the sending and receiving of data over network 102, but native applications executed by client device 120 can also facilitate the sending and receiving of data over network 102.

Search engine 150 directs users to results within a particular digital platform. In this example, search engine 150 searches through physical items and manufacturers 110 associated with or available through digital platform 130. Search engine 150 allows users to search for physical items that are, for example, for sale, for rent, available for use, etc. Users can search for the physical items by entering key terms or phrases that relate to the relevant physical item. For example, a user can enter the name of the item, enter physical attributes of the item, search by the source of the physical item, search by velocity data (e.g., whether an item is trending within digital platform 130). A user can enter a search query containing terms that describe physical attributes of an item the user wishes to find, and search engine 150 can search items available within digital platform 130 to return all relevant item or manufacturer results within digital platform 130. For example, an r-member can enter a search query of "floor lamp square base large shade" and search engine 150 can return a set of qualified manufacturer results that match the search query and other parameters within digital platform 130. This matching process is described in detail below.

Co-creation digital platform 130 facilitates the creation, organization, and display of information about physical items provided by physical item manufacturer 110. For example, digital platform 130 can act as a web server responding to requests, such as information requests, from users searching the digital platform 130 for information on physical items or wishing to execute a transaction involving physical items (e.g., manufacturing a physical item, purchasing a physical item, configuring the characteristics of a physical item, assigning the physical item, etc.). Digital platform 130 may communicate with other systems, such as database servers, to obtain the physical item information or to facilitate a transaction such as a purchase. Digital platform 130 is used to submit, maintain, and search information about physical items, such as characteristics of the item. In some implementations, digital platform 130 is a distributed computing system that utilizes multiple servers and databases, each of which performs a particular function (e.g., searching, transactional, etc.).

Digital platform 130 can be a computer system that maps physical attributes, and other characteristics, of physical items to the corresponding physical items. A user (e.g., a-member) of digital platform 130 can submit a request to digital platform 130 to view attributes of a particular physical item (e.g., provided by a user). Characteristics of physical items can include both physical attributes and non-physical attributes, as discussed above. For example, digital platform 130 can maintain characteristics data of physical items, including their size, shape, color, weight, the material out of which they are constructed, etc. Digital platform 130 can also maintain non-physical attributes of a particular physical item, including average revenue, average required amount, or average distribution volume for the particular physical item. In some implementations, digital platform 130 is an online marketplace that allows users to search for, and purchase, physical items. In another example application, digital platform 130 is a server management application that maintains information on physical servers, for example, can maintain physical attribute data on each server, including the number of active cores, the type of memory architecture used, the type of persistent storage used, etc.

Digital platform 130 includes a co-creation processor 132 that facilitates communication and co-creation between a requestor of an item and a manufacturer than can produce the item. Co-creation processor 132 can receive information from a user and produce a set of results that match the received information. For example, co-creation processor 132 can receive a set of attributes for a product from a requestor (e.g., a user of the platform, such as an r-member). Co-creation processor 132 can then produce a set of manufacturers that are qualified and experienced in manufacturing products having at least some of the set of attributes, such as the type of product, the location of distribution of the product, the dimensions of the product, etc.

Co-creation processor 132 can also facilitate a product review and feedback process between the r-member and their chosen manufacturer (e.g., m-member). Co-creation processor 132 can receive input from the designer through an interactive interface, detect relevant attributes and parameters from the input, and provide the relevant attributes and parameters to the manufacturer. For example, processor 132 can receive input from a user of client device 120 through an augmented reality or virtual reality user interface indicating a change in color to an item. Processor 132 can interpret the change in color as a change to an attribute and provide the updated attribute value to manufacturer 110 with whom the user is working to produce the item. This process is described in further detail below.

Co-creation processor 132 can detect a set of physical attributes for each physical item. Physical attributes can include objective physical attributes, such as a size or color of an item, as well as subjective features, such as the style of the item (e.g., whether it is bohemian, midcentury modern, hipster, antique, etc.) or a classification of the item (e.g., family-friendly, dog-oriented, romantic, fun for parties, etc.) Co-creation processor 132 can identify physical attributes for a particular item based on item properties provided to digital platform 130, such as a datasheet, a product brochure, a standards compliance form, etc. For example, digital platform 130 can receive a datasheet of a physical item, such as a mug, that indicates physical attributes of the mug, such as its size, its shape (e.g., whether it is a round mug, a square mug, a tall mug, etc.), its color, whether the mug is dishwasher, oven, and/or microwave safe, etc. Co-creation processor 132 can determine, using the received datasheet, the attribute value for each attribute and store the information in co-creation platform database 140.

Co-creation processor 132 can determine physical attributes of an item using other received information, such as a photo, a video, a written description, etc. For example, co-creation processor 132 can use image recognition on a photo of a handmade plate offered by manufacturer 110 to determine that the plate is octagonal, blue, and has a striped border. Co-creation processor 132 can determine physical attributes of an item based on user input and/or interaction with the item through user interfaces such as an augmented reality interface. For example, if a user interacts with an item to change its size through an augmented reality interface, co-creation processor 132 can determine physical attributes of an item Co-creation processor 132 can store these characteristic values in database 140 and map the values to the handmade plate item entry from manufacturer 110 within database 140.

Processor 132 can train and implement machine learning models to match a user inputting a set of attributes and additional data with a set of manufacturers that match the input; suggest an attribute value based on historical interaction and transaction data; and determine parameters of an item that have changed in response to input from a user. The machine learning models can be, for example, neural networks that receive training examples and user or profile information as input and outputs a set of manufacturers that match the input, an attribute value, or an updated parameter value. For example, processor 132 can determine how many manufacturers match a set of attributes and additional data provided by a user and, based on factors including the number of manufacturers, the uniqueness of the item, and the user's preferences, among other factors, determine a number of manufacturers to return to the user and identify qualified manufacturers to be returned to the user based on the determined number of manufacturers.

Client device 120 and digital platform 130 can gather user interaction data to generate training data to input to processor 132. Processor 132 can select a random sample of user interactions to obtain negative examples to train, for example, a logistic regression model of processor 132. Processor 132 can take multiple samples of user interaction data to generate one or more sets of training data.

When generating the set of training data, processor 132 selects training features used within the set of training data from historical user interactions with digital components. Processor 132 determines training example weights in one of several ways. In some implementations, processor 132 can weight each training example equally, and sample only data points within a predetermined period of time. In some implementations, processor 132 can use decay functions to weight training examples differently depending on how recent the example is.

Processor 132 can split training, validation, and generating test data into various percentages of modelling time and resources. Processor 132 can also cross validate the output of the model.

Processor 132 receives the training data and trains a machine learning model to determine a set of manufacturers that match input attributes and parameters; suggest an attribute value based on historical interaction and transaction data; and determine parameters of an item that have changed in response to input from a user. The machine learning model may use any of a variety of techniques such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning model uses supervised learning. In some examples, the machine learning model uses unsupervised learning. The machine learning model can also use wide and deep learning, long short-term memory modeling, boosting, matrix factorization, user embedding, or item embedding.

Processor 132 can analyze a cost function and use the results to make marketing suggestions to a user of client device 120. For example, processor 132 can apply a negative cost function, such that each time an action is taken, a cost is incurred, and processor 132 can minimize the total cost of collaboration with a manufacturer to produce an item and distribution of the item for the requesting user. The actions can include, for example, providing separate instances of distribution content, providing separate targeted offers, etc. Processor 132 can apply machine learning techniques such as reinforcement learning to optimize against a cost value—either an incurred cost or a budgeted cost. Because an incurred cost cannot be determined until an action is taken, processor 132 can apply inference methods (e.g., expectation of value, deep Q-learning, or other techniques) to a budgeted cost model to optimize a recommendation provided to a user of client device 120.

In some implementations, actions taken by the user are free, but have a true cost in terms of resources used, amount of time needed, effects on the reputation of the user, etc. For example, if a user is choosing between organic marketing on a digital platform different from digital platform 130 and promoted listings within digital platform 130, processor 132 can determine that organic marketing on the digital platform different from digital platform 130 requires time and reach (e.g., an audience).

Processor 132 can optimize for a metric specified by the requesting user. For example, the requesting user can specify whether processor 132 should optimize for a metric such as average revenue per order, average required amount per product, average sales volume, etc. If a user of client device 120 specifies multiple metrics across which it would like to processor 132 to optimize, processor 132 can select a particular metric across which to optimize the machine learning model.

Digital platform 130 can store its physical item data in a database, such as co-creation platform database 140. Database 140 stores and logs physical item characteristic data. Digital platform 130 can map physical items and their characteristic data and store the data in database 140. Database 140 can store other item attributes, including the manufacturer 110 of the item, the required amount for the item, a location of the item, etc. When digital platform 130 receives a request for data or a user interaction that includes characteristic data of a physical item, digital platform 130 accesses database 140.

Digital platform 130 also allows for an r-member and a product manufacturer to negotiate, for example, a pricing and payment structure. In some implementations, the user of client device 120 and the selected manufacturer 110 can negotiate a schedule and structure for payment from the user to the manufacturer 110. For example, the designer and manufacturer can agree on 3 review cycles, with 50% payment up front, 10% after each review cycle, and the last 20% on delivery. The designer and manufacturer can decide on which portions of the payment are refundable and which portions are not refundable. In some implementations, digital platform 130 allows candidate manufacturers 110 to bid on producing the product.

Digital platform 130 allows the designer to review the final product before signing off on the product. This allows the designer to have more control over the manufacturing process, and provides manufacturers more protection from dissatisfied customers. In some implementations, digital platform 130 facilitates a structured process and feedback mechanism for the post-production process as well. For example, digital platform 130 allows for review of the shipping process, including packaging and delivery.

Communications interface 134 provides a connection between digital platform 130 and users of the platform, such as manufacturers 110 and client devices 120. Communications interface 134 allows, for example, co-creation processor 132 to communicate with other devices through network 102.

Figure 2:
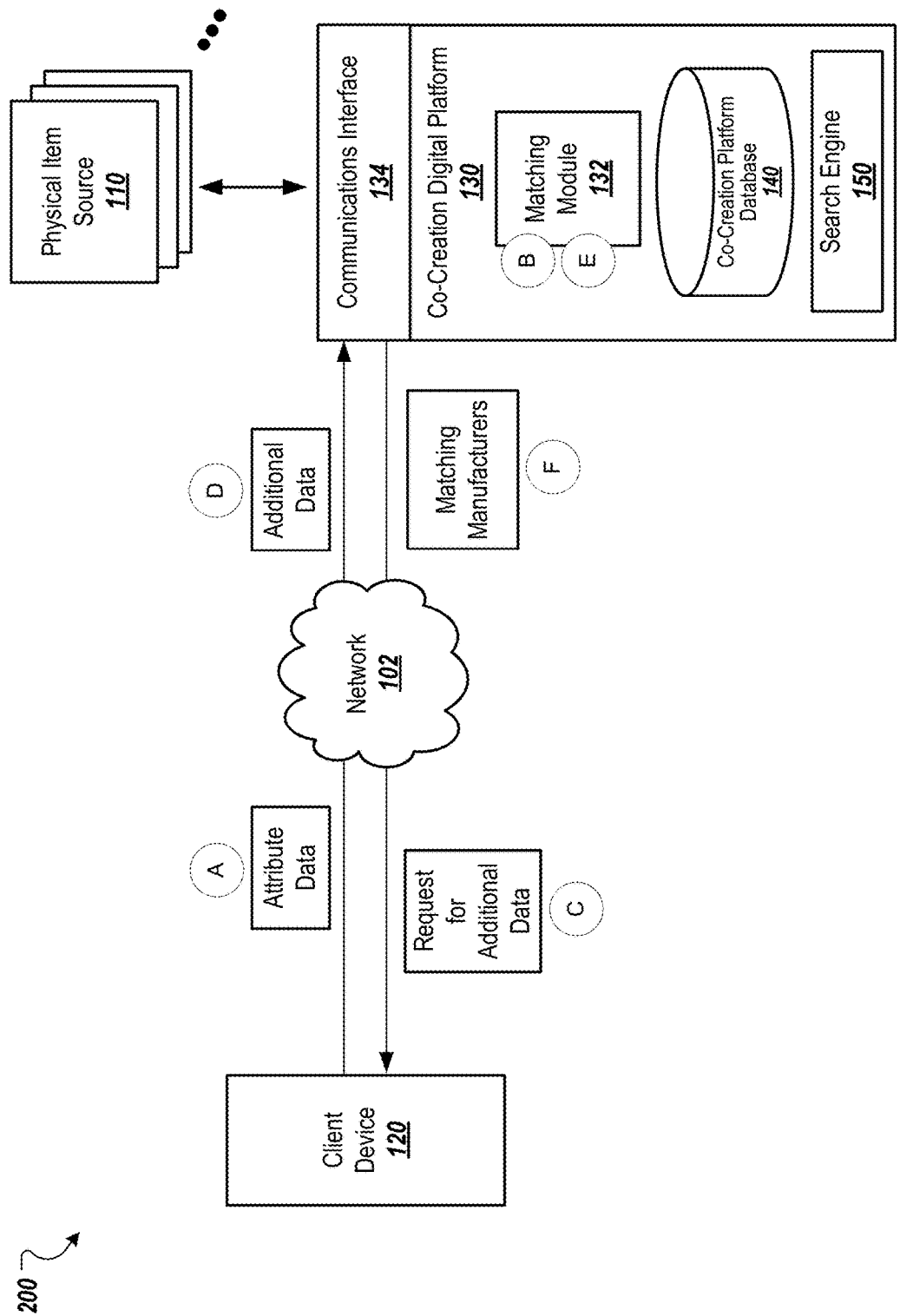
FIG. 2 illustrates a process for enabling collaboration through the co-creation system by matching a user with a manufacturer.

FIG. 2 illustrates a process, or data flow, 200 for enabling collaboration through the co-creation system by matching a user with a manufacturer. Operations of data flow 200 are performed by co-creation digital platform 130 contacting multiple devices, including client device 120 and physical item manufacturer 110. In some implementations, stages of the flow 200 are performed within a network environment, such as environment 100.

In some examples, client device 120 is a mobile device, such as a cellphone, a smartphone, or a tablet that communicates over a wireless network. Digital platform 130 and manufacturer 110 may communicate over a wired network separate from the wireless network over which client device 120 communicates. For example, client device 106 may be a smartphone that communicates over a wireless cellular network, while digital platform 130 and manufacturer 110 communicate over wired networks.

The flow 200 begins with stage (A), in which client device 120 provides attribute data to digital platform 130 through network 102. Client device 120 can provide attribute data when communicating with digital platform 130. For example, if a user of digital platform 130 accesses information from digital platform 130 through their client device 120, client device 120 can provide attribute data including an identifier of client device 120, a time of the interaction, a location of client device 120 at the time of interaction, etc.

An r-member user of digital platform 130 can provide, for example, attribute data of a physical product they wish to have manufactured. The r-member can provide attribute data through client device 120 to digital platform 130 through network 102. The attribute data can include attributes of an item to be manufactured, the designer, and/or the manufacturer. Attributes of a physical item can include physical attributes and non-physical attributes. Physical attribute data of a product can include a product type, a style, a material, a color, and/or dimensions, among other attributes.

For example, client device 120 can provide attribute data indicating that the particular product the r-member wishes to have manufactured is a piece of furniture, and that the material is real wood. Non-physical attribute data of a product can include, for example, a manufacturing method for producing the item. Attributes of the r-member can include a required amount of item, the scope of the project, the user's preferred method of collaboration, a preferred product review process, the preferred delivery time and/or date, the preferred pricing, etc. Attributes of the manufacturer can include the facilities and tools needed, the manufacturer's pricing, the manufacturer's preferred payment structure, etc. For example, client device 120 can provide attribute data indicating the production area associated with the product the user wishes to have manufactured. Client device 120 can provide multiple values for each attribute. For example, an r-member may want to purchase an item in many different materials; the user of client device 120 may provide multiple values for the materials attribute to indicate multiple acceptable values for the attribute.

The attribute data can indicate that an item may require a multi-step manufacturing process that can be implemented by different manufacturers. For example, if a user wishes to manufacture embroidered jeans, one manufacturer may produce unembroidered jeans while another manufacturer performs the embroidery according to the user's standards.

Digital platform 130 can also receive attribute data including activity or interaction data from other devices, including remote servers or other digital platforms. For example, digital platform 130 can receive activity data indicating user interactions with items having attributes matching the attribute data provided by client device 120 from a separate search engine that aggregates search data to determine a number of searches performed for the items. Digital platform 130 can receive manufacturer data. For example, digital platform can receive a set of manufacturers who have produced the items, a satisfaction rating for each of the set of manufacturers, etc.

The interaction data does not need to be associated with a particular physical item, and digital platform 130 can generalize the interaction data to other items that shares attributes with the physical item indicated by the interaction data. For example, digital platform 130 can receive an aggregate of searches for t-shirts on a particular search engine, social platform or mobile application. While the searches are not associated with a single physical item, digital platform 130 can extract data and results to be applied to various t-shirt products within digital platform 130. For example, digital platform 130 can generalize the aggregate data from individual sources 110 that manufacture t-shirts. Data may be aggregated or anonymized in a manner that prevents reversible determination of information related to an individual source, through such methods as removal of long tail data, use of coarse filters, or anonymization. Individual sources, or end users, may be given an option to participate through a set of options available through a centralized site, or through options recorded in an operating system, browser, or via third party settings. Aggregate information and implementations may be restricted in a fashion that it prevents individual sources from using the data to improperly coordinate or communicate on specific products or services.

Digital platform 130 can also receive transactional data, such as product sales data. For example, sales of physical items having particular attributes on digital platform 130 performed through client device 120 can be provided to digital platform 130. Interaction data can also include, for example, data generated from user interactions with content related to a particular physical item, such as distribution content.

The flow 200 continues with stage (B), in which co-creation processor 132 analyzes the received attribute data and uses the received attribute data to filter and select a set of attributes for which the user of client device 120 is prompted for more information. For example, if the received attribute data indicates that a product that the r-member wishes to have manufactured is a wooden piece of furniture, co-creation processor 132 can analyze this attribute data and request further information on the type of furniture and the type of wood to be used for manufacturing the furniture. If multiple values are provided for one or more attributes, then multiple values for each attribute will be analyzed. Different values can be weighted differently in processor 132's analysis. Co-creation processor 132 selects the set of requests based on the type of item indicated by the user through the received attribute data. For example, co-creation processor 132 can determine a set of follow-up questions to present to the user of client device 120 through a user interface of client device 120 in response to the received attribute data.

In some implementations, the set of requests are category specific and are narrowly tailored to the category or type of item indicated by the received attribute data. For example, a set of follow-up questions generated by co-creation processor 132 for an item within the clothing category can be different from the follow-up questions generated by co-creation processor 132 for an item within the shoe category, even if both items are within the larger apparel category.

In some implementations, co-creation processor 132 can provide suggestions for attribute values that have historically performed well with users. For example, co-creation processor 132 can analyze historical interaction and transaction data to determine that birch furniture is trending with users of digital platform 130, and can suggest "birch" as an option for the type of wood used for the furniture piece. The historical interaction and transaction data can be accessed from the database 140 and can be gathered from multiple items provided by various different manufacturers 110.

Co-creation processor 132 trains a machine learning model (or accesses an already trained machine learning model) to determine a set of attributes for which further information is requested and/or suggestions for attribute values for the set of attributes. The machine learning model may use any of a variety of techniques such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning model uses supervised learning, or semi-supervised learning in which the ground-truth values of only a subset of examples are known. In some examples, the machine learning model uses unsupervised learning. The machine learning model can also use wide and deep learning, long short-term memory modeling, boosting, matrix factorization, user embedding, or item embedding.

For ease of explanation, the operation of processor 132's machine learning model is described with respect to reinforcement learning, but it is understood that the machine learning model could utilize any of a number of other techniques as described above, including bandit-theory driven machine learning.

Processor 132 can input the received attribute data to a machine learning model that outputs a set of attributes for which further information is to be requested from the user of client device 120 and/or a suggestion of values for the set of attributes. For example, if processor 132 inputs received attribute data that indicates the item to be produced is a complicated metal automotive part, processor 132, the machine learning model can output a set of follow-up questions to the user of client device 120 regarding the manufacturing method that the designer would like to use (e.g., machined by hand, 3d printed, etc.) to create the item and the amount and type of experience the designer prefers to see in a manufacturer.

Processor 132 can analyze multiple factors to generate a recommendation to the user of client device 120. For example, processor 132 can analyze the number of or change in the number of searches or sales for a variety of items in the same category as the user of client device 120 indicated, and can generate a recommendation for the combination of attributes that has been most popular among customers on digital platform 130. In some implementations, processor 132 can provide a recommendation that requires the least amount of change from the current physical attributes of the physical items that the user of client device 120 provides. For example, if the user of client device 120 provided input indicating they wished to have purple, square mugs with curved handles produced, and processor 132 has determined that purple, round mugs with square handles have been performing better with customers of digital platform 130 than the mug as indicated by the user, processor 132 can provide a recommendation to the user to make a physical change to the mugs to provide square handles, as the user has indicated that the shape of the handles is easier to change than the shape of mug itself The flow 200 continues with stage (C), in which digital platform 130 provides a request for additional data to client device 120. Digital platform 130 can transmit the request to client device 120 through communications interface 134. The request for additional data includes the set of attributes for which further information is to be requested from the user of client device 120 generated by match processor 132 in stage (B). For example, the request for additional data can include a set of questions regarding the product that the user of client device 120 wishes to have manufactured by a manufacturer 110. The request for additional data can include a request for confirmation of a suggestion from co-creation processor 132. For example, if co-creation processor 132 has determined a suggested value for an attribute of the product that the user of client device 120 wishes to have manufactured, the request can include the suggested value instead of, or in addition to, a set of attributes for which further information is to be requested from the user of client device 120.

The user of client device 120 can provide input through a user interface in response to the request for additional data. For example, if the request includes a set of questions, the user can select from among options provided or enter their own answers through a user interface of the client device 120.

The flow 200 continues with stage (D), in which client device 120 provides additional data to digital platform 130. Digital platform 130 can receive the additional data from client device 120 through communications interface 134. The additional data includes, for example, a response to the set of attributes for which further information is to be requested from the user of client device 120. For example, if the attribute data indicated that the item to be manufactured is nursery furniture, processor 132 can generate a set of questions tailored to nursery furniture, including what type of nursery furniture it is (e.g., crib, changing table, rocker, etc.); what types of non-toxic, child-safe materials to use; whether the furniture can be adjustable, etc. The user can provide multiple values for each attribute.

The additional data can include a response to processor 132's suggested value for an attribute of the product. A user can choose to accept, reject, or modify the suggested value for an attribute of the product. For example, if processor 132 suggested a particular wash for a denim jacket to be produced, a user of client device 120 can modify the suggested wash for the denim jacket from the suggested dark indigo to a slightly less dark shade of indigo.

In one implementation, the additional data can include user interaction data with the product through an interactive interface, such as an augmented reality user interface. The user can, for example, interact with a model or prototype of the product as the m-member has produced it in an augmented reality interface. The additional data can indicate the actions that the user took with respect to the prototype and processor 132 can use additional data to determine new attribute values for the product. For example, if a user enlarges a prototype bookshelf within an augmented reality interface that corresponds to a real space in which the bookshelf will be used, client device 120 can provide the enlargement interaction data to digital platform 130. Processor 132 can then use the enlargement interaction data to determine, based on information such as dimensions of the augmented reality interface and the dimensions of the enlarged bookshelf with respect to the augmented reality interface, new dimension values for the bookshelf to be provided to the manufacturer 110.

The flow 200 continues with stage (E), in which processor 132 determines a set of results to provide to client device 120. In this particular example, the set of results is a set of qualified manufacturers that match the attribute data and additional data provided by the user of client device 120.

The total set of results of qualified manufacturers that match the attribute data and additional data provided by the user of client device 120 can include a very large number of manufacturers. For example, if a user inputs a very general set of attributes, the number of manufacturers identified by processor 132 from within database 140 can be an overwhelming number, and it can be difficult for the user of client device 120 to parse through the entire set of results.

Processor 132 can improve the efficiency of the matching process between an item requestor and a manufacturer who can produce the item by adjusting the number of manufacturers provided as a result to a user. Processor 132 provides a requesting user with an appropriate number of candidate manufacturers by including enough choices to allow the user to perform their own research and select from among the candidates. Processor 132 also adjusts the number of candidate m-members included the results to prevent the matching process from becoming burdensome. Processor 132 implements a sliding scale that uses various factors to determine a number of matching m-members to return to an r-member. These factors include the uniqueness of the item; the number of manufacturers that match the attributes and additional data provided by the user of client device 120 and the degree to which the manufacturers match the attributes and additional data; the item type; the style of the item; the preferences and historical data associated with the user of client device 120 wishing to have the item produced; and the credibility of the manufacturers; among other factors. These factors can be weighted differently and some can be considered more heavily than others.

Digital platform 130 includes credibility mechanisms that allow users to evaluate the credibility of other users. These credibility mechanisms can be used to evaluate how qualified a user is for a particular project. For example, a user who sells or creates items offered through digital platform 130 (e.g., an m-member) can have a credibility score based on customer satisfaction ratings. The scores can indicate factors such as the quality of the time, the m-member's timeliness in responding to customer messages, the m-member's shipping and packing methods, the m-member's delivery time, how long the m-member has been selling items through digital platform 130, the design of the items, and how well the item matches the description (e.g., including photos, text descriptions, tags, keywords, etc.) on digital platform 130, among other factors. The credibility rating can encompass factors including whether the m-member has produced an item with similar characteristics to the attributes provided by the r-member, whether the m-member has the tools required to create the item, whether the m-member has received high quality feedback from users involved with previous interactions and/or transactions, etc.

For example, if a seller (e.g., m-member) on digital platform 130 takes a long time to respond to customer messages (i.e., has a poor timeliness rating), has been selling hand-knitted socks on the platform for the entire time that digital platform 130 has been available (i.e., has a high seniority rating that indicates the amount of time the seller has been selling on the platform), and has very satisfied customers who think that the design of the socks are just okay (i.e., has a mediocre design rating) and that socks they receive look exactly like the descriptions of the socks on digital platform (i.e., has a high accuracy rating), that seller can have an overall high credibility score.

A user's credibility score (e.g., a credibility score for a particular m-member) can change (or be adjusted) on a per-requesting-member basis. For example, if a user of client device 120 (i.e., an r-member) indicates that seniority is not important to them, but that design is very important, the same m-member's credibility score can be an overall poor credibility score for the r-member. The r-member can indicate their preferences for the various m-member credibility factors, for example, through a user profile. In some implementations, attribute data provided by the user of client device 120 can include credibility score factor preferences, and the system can update the user interface to present only those credibility score factors that are available for the current set of candidate m-members for the attribute data already input by the r-member.

Processor 132 evaluates each user, including r-members and m-members, within digital platform 130 based on their credibility. For example, processor 132 can use a manufacturer's credibility rating among the factors considered to determine whether a manufacturer is included in a set of results provided to a user in response to a set of attributes and additional information. Processor 132 can determine a degree to which an m-member matches a set of attributes and additional data provided by the user of client device 120. For example, if an m-member matches four out of five attributes and additional data, processor 132 can determine that the m-member has a high degree of matching. Particular attributes or other factors can be weighted differently, and the degree to which the m-member matches can vary based on the machine learning model that processor 132 uses.

Processor 132 uses a machine learning model to determine a number of m-members to include in the set of m-members to return to the user. In some implementations, processor 132 can receive an input from the user of client device 120 indicating a preferred number of results. For example, a user of client device 120 can provide, to digital platform 130, a number of results the user would like to receive in response to a query to digital platform 130 for an m-member. In some implementations, the user can provide a threshold number of results, such as a maximum number of results. In some implementations, processor 132 can use a predetermined maximum number of results. For example, processor 132 can receive a number of maximum results or be pre-programmed to include a maximum number of results. Processor 132 can determine a maximum number of results that is optimal for a user to review. For example, processor 132 can use a machine learning model to determine a maximum number of results that allows a user to achieve the highest level of satisfaction, spend the least amount of time considering the references, and/or be able to fully research and consider each of the m-members, among other factors.

Processor 132 determines the maximum number of results to provide based on, for example, uniqueness of the item to be produced. The uniqueness of an item can be determined, for example, based on the number that have been (or will be) produced or the attributes of the item itself in comparison to the inventory available on digital platform 130. For example, the fewer items on the digital platform having the attributes specified by the user, the more unique the item.

In some implementations, the uniqueness of an item can be quantified by a score. For example, based on the attribute data of a particular item, processor 132 can determine a measure of how unique an item having a particular combination of attributes is through comparison to other items available through digital platform 130, stored in database 140, or accessible by search engine 150. Processor 132 can use third party data obtained from third party systems or devices, including search engine data, interaction data, or transactional data, as a factor in determining an item's uniqueness. For example, if third party search engines return few results or no results for items having the particular combination of attributes that the item has, then processor 132 can increase the uniqueness score of the item, where a high uniqueness score indicates that the item is more unique. Processor 132 can determine, based on the uniqueness of an item, an optimal number of candidate m-members to a requesting user of client device 120 as a result. For example, if an item has a high uniqueness score, processor 132 can increase the number of candidate m-members to provide the requesting user with more options.

Processor 132 facilitates alignment of design and manufacturing expectations between a user, or an r-member, who inputs design parameters (e.g., a set of attributes and additional data regarding an item to be manufactured) and a manufacturer, or an m-member, with whom the user has chosen to collaborate. Processor 132 first filters the full set of m-members on digital platform 130 and in database 140 according to the user input (e.g., the set of attributes and any additional data provided by the user). For example, processor 132 will narrow the list of candidate m-members to only include those m-members who produce flower vases (the type of item indicated by the user's input). In this example, the user of client device 120 has also provided, as additional data, that the flower vases should be made of glass, and processor 132 will further narrow the list of candidate m-members to include those m-members who produce glass flower vases.

Processor 132 can further determine the number of m-members to provide to the user factors including the m-member's reputation, and the user's style to filter out additional m-members. For example, once processor 132 has narrowed the list of candidate m-members based on the set of attributes the user of client device 120 provided and any additional data that the user provided, if the narrowed list of candidate m-members includes a number of m-members over the maximum threshold number of m-members, processor 132 can use other factors to filter out additional m-members. Processor 132 can used these other factors to reduce the list of candidate m-members to the maximum threshold number of m-members.

Processor 132 can use machine learning models to reduce, based on a combination of factors, including the m-member's reputation and the user's style, the set of candidate m-members to meet the maximum threshold number of candidate m-members. In some implementations, processor 132 can determine, for each m-member, scores for each factor. For example, processor 132 can determine, based on historical interaction and transaction data, a score for the m-member's reputation, or credibility, and remove candidate m-members who have the lowest credibility score. In addition to the factors described above, candidate m-members can be evaluated based on information such as the m-member's prices or pricing structure, the amount of inventory that the m-member is able to produce. Processor 132 can determine, based on profile information provided by the user of client device 120, a set of attributes that describe the user's style. Processor 132 can then determine, based on profile information provided by the m-member and based on historical interaction and transaction data, a score for the m-member's compatibility with the user's style. Processor 132 can use each m-member's style compatibility score to further narrow the field of candidate m-members by removing candidate m-members who have the lowest style compatibility score.

Processor 132 can determine an order in which to apply the narrowing attributes and factors. For example, processor 132 can determine an optimal order in which to apply the narrowing attributes and factors based on the user's preferences. A user can specify which attributes and factors are more important to the user. For example, a user can provide, as part of a user profile or data provided to digital platform 130, attributes and/or factors that are important to the user when selecting collaborators. In some implementations, processor 132 can determine an optimal order in which apply the narrowing attributes and factors such that the user is the most satisfied with the matching process. For example, processor 132 can receive feedback from the user regarding their satisfaction with the matching process, including how long the process takes and how well the results meet the user's expectations, among other factors. Processor 132 can use this feedback to determine an order in which to apply the narrowing attributes and factors.

Processor 132 can receive data from client device 120 and digital platform 130 in addition to the narrowing attributes from client device 120. For example, processor 132 can determine additional narrowing factors from the additional data provided by client device 120 or data received from digital platform 130. Client device 120 can provide, for example, metadata from historical interactions and transactions. Metadata includes location data, device data, and interaction or transaction data, among other types of data.

The flow 200 continues with stage (F), in which digital platform 130 provides a list of candidate m-members 110 to the user of client device 120. Once processor 132 has narrowed down the list of candidate m-members, digital platform 130 can provide the list to client device over network 102.

The flow 200 can continue with stage (A) again, in which a client device 120 provides interaction and/or activity data to digital platform 130. In stages (A) and (F), digital platform 130 receives data it uses to generate or update a list of candidate m-members or attribute values.

Processor 132 can provide recommendations for changes to other attributes of the listing of a physical item by a user of digital platform 130. For example, if the user is a user that manufactures the physical items it sells on digital platform 130, processor 132 can suggest actions that can be performed on digital platform 130. Processor 132 can suggest that the user promote a listing that has a set of attributes with high velocity factors to increase competitiveness in a heated market for physical items with the set of attributes, by promoting the listing within search results, including the listing in targeted offers (e.g., coupons, advertisements, etc.), or changes to the promotion strategy on other digital platforms (e.g., changing promotions on other websites, digital platforms, servers, etc.).

Digital platform 130 can provide recommendations to a user for items that don't yet exist. For example, based on the feedback information it receives from client 120 or sources such as other digital platforms or devices, digital platform 130 can suggest to the user to begin offering a particular item with particular physical attributes. Processor 132 can provide, as input to its machine learning model, the sequencing of actions of a user to customize recommendations for the user. For example, if a user that produces socks with firework designs is highly interested in promotional listings, and places higher bids on promotional listings around July $4^{th}$, processor 132 can weigh the time period around July $4^{th}$ more heavily in the machine learning model for a user. If the user is a seasonal user that specializes in winter-weather accessories such as scarves and hats, processor 132 can monitor seasonal trends in interest, and can adjust training examples for its machine learning model such that a decline in interest in the user's items as outdoor temperatures increase are not necessarily interpreted as negative. As the user's business grows and its behavior changes, processor 132 can update its machine learning model such that its recommendations change with the user. For example, processor 132 can provide a user that grows from a single artisan who makes each item by hand to several artisans who mass produce some items and make some items by hand with optimal recommendations for the user's current stage of growth.

Processor 132 can generalize its recommendations across different vendors having similar products or inventory. For example, processor 132 can generalize its recommendation for a particular user 110 who distributes socks, as the target audience on digital platform 130 is likely to be similar, and recommend investing a threshold amount of user 110's budget in targeted offers.

Figure 3:
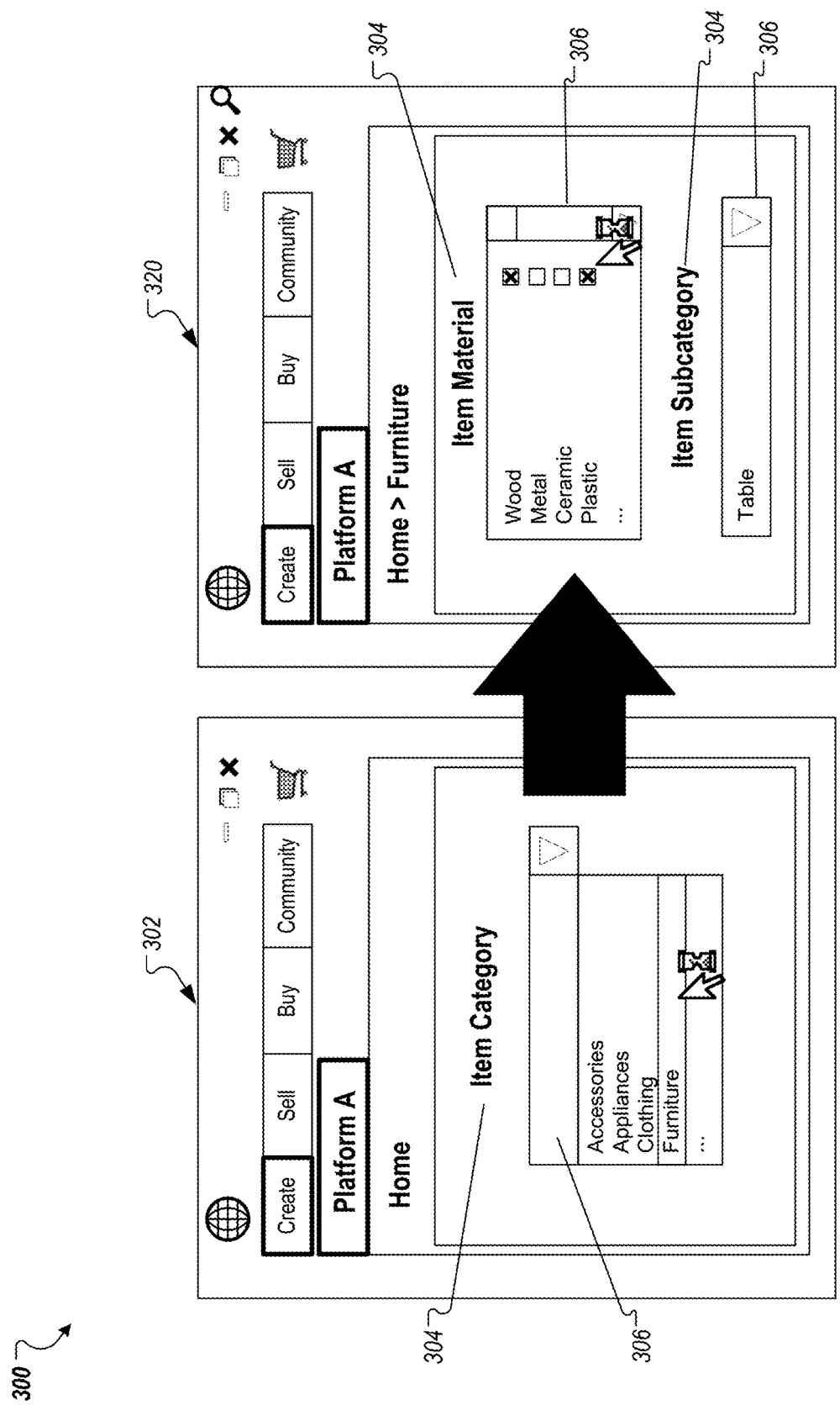
FIG. 3 illustrates an example user interface for the co-creation system through which a user is prompted for input regarding a product.

FIG. 3 illustrates an example user interface 300 for digital platform 130. For example, the physical item digital platform can be digital platform 130 and communicably connected by a network, such as network 102, to a client device, such as client device 120.

In stage 302 of user interface 300, a user of digital platform 130 who designs items can access user interface 300 to begin the process of creating an item. In this example, digital platform 130 is a digital marketplace that allows users to create, market, and purchase items on digital platform 130. The user may be a designer who doesn't have the means to mass produce items, or the expertise in crafting the item. In this example, the user is shown on the "create" section of digital platform 130. The user is looking for a manufacturer with whom to collaborate to manufacture an item.

Stage 302 illustrates a stage of user interface 300 through which the user can input a value of an attribute 304. In this example, attribute 304 is a category, or type, of item to be produced. The user can enter a value for the item category through user interface element 306. In this example, user interface element 306 is a drop down menu from which the user can select a value for the item category from among a variety of set choices. User interface element 306 can be a variety of elements, such as radio buttons, check boxes, buttons, and textboxes, among other elements. User interface element 306 can accept input including audio and video input, as well as input through a touchscreen, such as a gesture or handwriting.

Stage 302 of user interface 300 can be used, for example, to provide attribute data to digital platform 130 as described in FIG. 2. In this example, the user has selected "Furniture" as the value for the "Item Category" attribute.

Stage 302 illustrates a stage of user interface 300 following stage 302 in which a user can input additional data regarding the item to be produced. In this example, the additional data includes values for attributes including the material and subcategory for the item to be produced. Stage 302 of user interface 300 can be used, for example, to provide additional data to digital platform 130 as described in FIG. 2. In this example, the user has selected "Wood" and "Plastic" as candidate materials for the item, and "Table" as the subcategory of the item.

As described above, the attribute data and any additional data entered by the user of client device 120 through user interface 300 can be provided to digital platform 130 and used by processor 132 to generate a list of candidate m-members to return to the user in response to the input. The candidate m-members can be manufacturers 110 who use digital platform 130.

Figure 4:
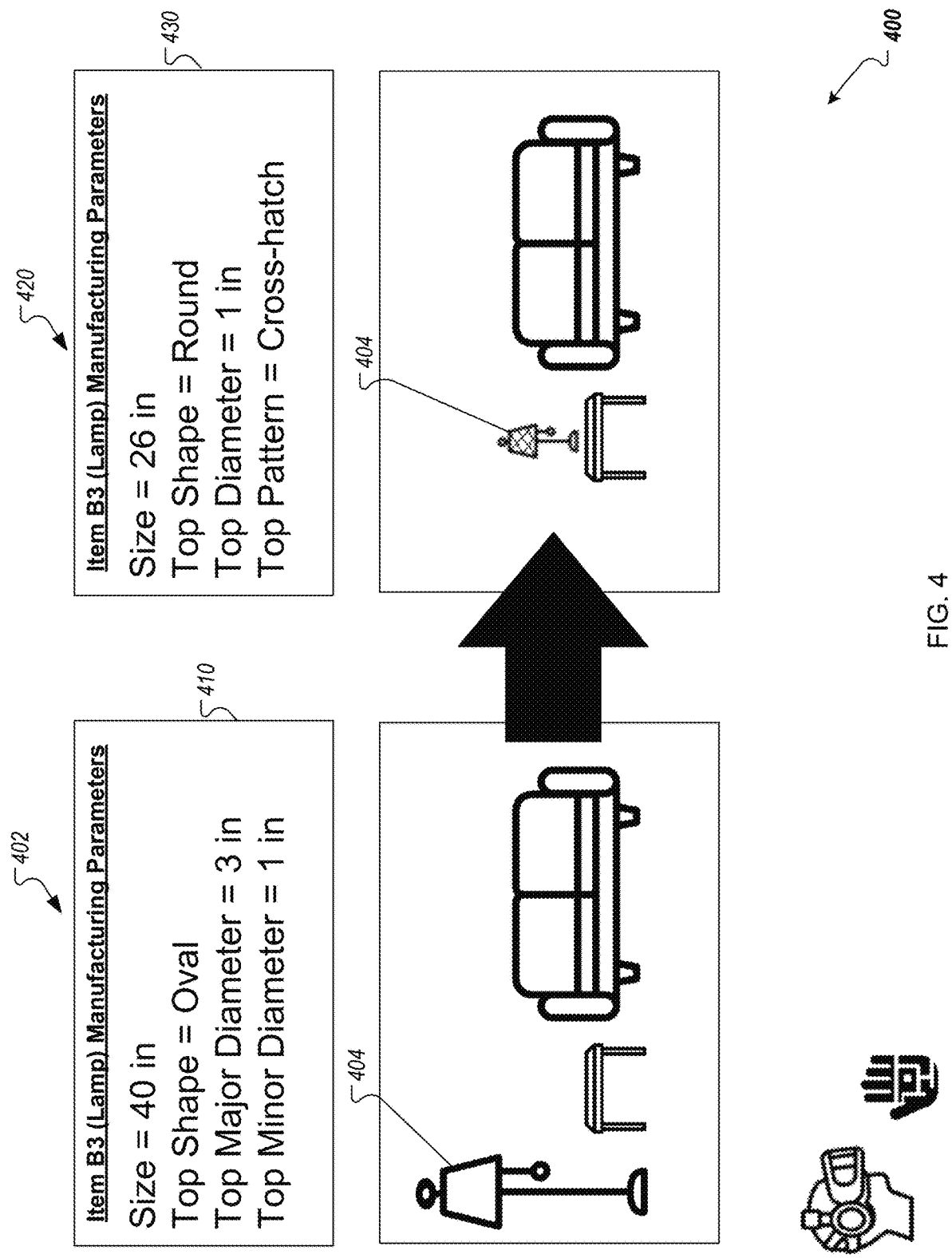
FIG. 4 illustrates an example process for receiving input from a user to alter parameters of a product.

FIG. 4 illustrates an example user interface 400 for digital platform 130. For example, the physical item digital platform can be digital platform 130 and communicably connected by a network, such as network 102, to a client device, such as client device 120, and to an m-member, such as manufacturer 110. The manufacturer 110 can be the manufacturer chosen by the user of client device 120 through the matching process as described above in FIGS. 1-3.

Digital platform 130 facilitates an intuitive feedback process between an item designer and their chosen manufacturing collaborator. Digital platform 130 can provided a platform through which the requestor and the manufacturer can set up a virtual meet. The requestor can provide guidance regarding the design of the item through digital platform 130 through a simple interface that processes and translates the guidance into updated values for attributes of the item being manufactured by the manufacturer. These review cycles, which can be repeated throughout the process, allow the requestor and the manufacturer to align on the design of an item and what is feasible, most efficient to produce given available resources, etc.

Digital platform 130 includes verification mechanisms throughout the co-creation process. These mechanisms allow a requestor and a manufacturer to provide feedback regarding the process and the other party, and can help ensure that both parties are satisfied with the end product. For example, digital platform 130 can remain within a particular review cycle until both of the requestor and the manufacturer are satisfied, as indicated, for example, by a data submission by each party representing their satisfaction. Digital platform 130 can determine, for example, particular aspects of a project that are negotiable and aspects of a project that are not negotiable. For example, digital platform 130 can verify that a color change to a shirt will not affect the non-negotiable delivery date before allowing the process to continue. In another example, digital platform 130 can determine that a material change to a drafting table will affect the negotiable price, and digital platform 130 can facilitate discussion between the requestor and the manufacturer to determine whether an agreement can be reached before proceeding.

In some implementations, digital platform 130 can take actions to end the co-creation process if, for example, the requestor and the manufacturer cannot agree on a particular aspect of the manufacturing process. In one example, if a requestor insists that an intricate piece inlaid in a watch be made out of diamond and will not approve the model without this aspect of the project and the manufacturer cannot fulfill this request (because it is cost-prohibitive, difficult or impossible to achieve, etc.), then digital platform 130 can end the co-creation process so that neither party is disappointed if the process were to move forward.

In this particular example, user interface 400 is an augmented reality interface through which a user of client device 120 can review an item being produced by a manufacturer 110. User interface 400 can be implemented as other user interface types, including virtual reality, 3D models, etc. For example, user interface 400 can be an interactive social media application that allows the user to interact with an item by drawing on the item, dragging the item, stretching the item, shrinking the item, putting stickers on the item, changing the item's color, material, texture, etc. User interface 400 allows users to visualize their product in the actual space that the item will go in. In some implementations, user interface 400 is interactive, and allows a user to see how the item will operate, for example, by picking up the item, moving pieces of the item, etc.

Stage 402 of user interface 400 illustrates an augmented reality interface in which a model of an item 404 is rendered. In this particular example, item 404 is a lamp, and is rendered in a living room setting in which the user intends lamp 404 to be used. Parameters 410 of item 404 indicate the current attribute values for the lamp. In this particular example, the size of the lamp is 40 inches, the shape of the top piece of the lamp is oval, the major diameter of the top piece of the lamp is 3 inches, and the minor diameter of the top piece of the lamp is 1 inch.

In some implementations, item 404 can be an item of clothing or a wearable item. For example, item 404 can be a fitness watch that is highly customizable. A user can change the size of the face, the material of the body, the finish of the body, the material of the strap, and the color of the strap, among other attributes of watch 404. These attributes can be changed by changing parameters 410 of watch 404. In such an example, watch 404 can be rendered on the user's wrist, which is the setting in which the user intends watch 404 to be used.

A user of client device 120 is able to interact with the model of item 404 rendered within user interface 400. For example, the user of client device 120 can manipulate the model of item 404 through interface 400. The user can, for example, draw on the item to provide notes, interact with the item to rotate it, change its color, its material, etc. The user can superimpose images on the item. For example, the user can superimpose a pattern on the item and the pattern can be applied to the item as an attribute.

In this example, the user interacts with the model of lamp 404 to move the lamp within the augmented reality space and place the model of lamp 404 on the table. The user has also made the lamp smaller. The user has changed the shape of the top piece, and changed the size of the top piece as well. The user has also added a pattern to the shade.

Stage 420 of user interface 400 illustrates an augmented reality interface in which item 404 is rendered. The changes that the user made to the model of lamp 404 are reflected in stage 420 and the updated parameters 430. Processor 132 has determined, based on the changes made by the user to the model of lamp 404 through user interface 400, the updated parameters 430 for the model of lamp 404 as described above with respect to FIGS. 1-2. In this example, processor 132 uses machine learning models to translate the changes made by the user to the model of lamp 404 through interactions in augmented reality user interface 400 into updated parameters 430. As illustrated in stage 420, processor 132 can automatically determine updated parameters 430 and also determine when a parameter is no longer necessary, or needs to be added. For example, updated parameters 430 no longer require both a major diameter and a minor diameter, because the top piece is a sphere and has a single consistent diameter. Additionally, updated parameters 430 include an additional parameter value of the cross-hatch pattern on the lamp 404's shade.

Updated parameters 430 are provided to manufacturer 110 with whom the user is collaborating to make item 404. Updated parameters 430 can be provided to manufacturer 110 through digital platform 130. For example, once digital platform 130 receives the changes made by the user of client device 120 from client device 120, processor 132 determines updated parameters 430 and digital platform 130 can provide updated parameters 430 to manufacturer 110.

Digital platform 130 can use the changed attributes to generate a work order, or instructions, for creating the item according to the changed attributes. For example, digital platform 130 can automatically provide the updated parameters 430 to manufacturer and provide instructions to manufacturer 110 to source materials required to create the item. Digital platform 130 can assist manufacturer 110 in producing the item based on updated parameters 430. For example, processor 132 can generate CAD documents of the item and provide the documents to manufacturer 110. Digital platform 130 can initiate production of the item according to the changed attributes. For example, processor 132 can provide instructions to manufacturer 110 to initiate production of the item based on updated parameters 430.

Figure 5:
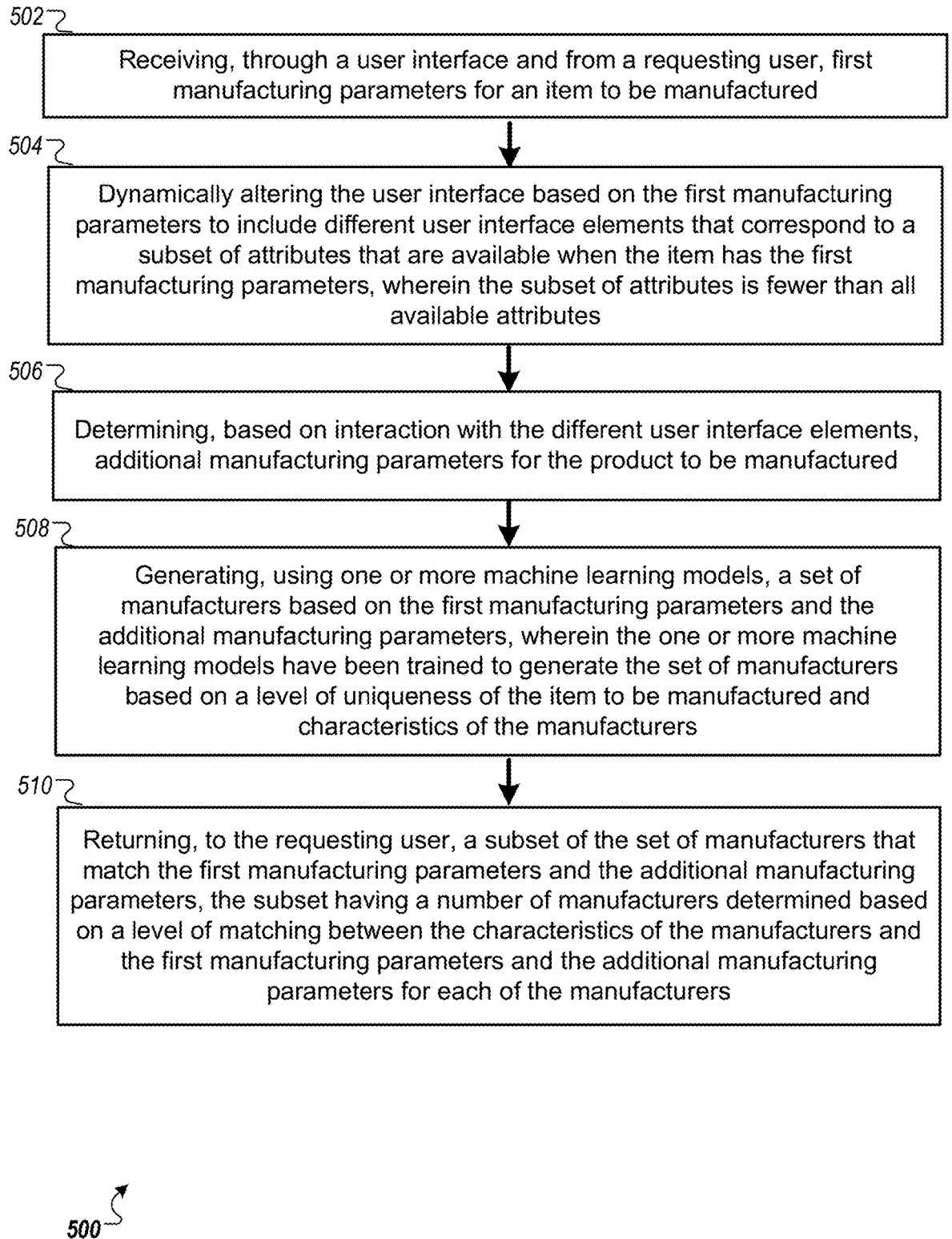
FIG. 5 is a flow chart of an example process for matching a user with a manufacturer through the co-creation system.

FIG. 5 is a flow chart of an example process 500 for matching a requestor to a manufacturer. In some implementations, the process 500 can be implemented by a co-creation digital platform, such as digital platform 130 of system 100. In some implementations, the process 500 can be implemented as instructions stored on a non-transitory computer readable medium, and when the instructions are executed by one or more servers, the instructions can cause the one or more servers to perform operations of the process 500.

Process 500 begins with receiving, through a user interface and from a user, first manufacturing parameters for an item to be manufactured (502). For example, a user of client device 120 can provide input of a set of attributes related to an item to be manufactured to digital platform 130 through client device 120.

Process 500 continues with dynamically altering the user interface based on the first manufacturing parameters to include different user interface elements that correspond to a subset of attributes that are available when the item has the first manufacturing parameters, wherein the subset of attributes is fewer than all available attributes (504). For example, processor 132 can determine, based on the input, a set of attributes for which additional data is requested. Processor 132 can then provide a request for additional data to client device 120. The request can be, for example, in the form of a question or a user interface element with which the user interacts to provide the additional data.

Process 500 continues with determining, based on interaction with the different user interface elements, additional manufacturing parameters for the product to be manufactured (506). For example, digital platform 130 can receive, from client device 120, the additional data and processor 132 can use the additional data and the input data to determine additional parameters for the product.

Process 500 continues with generating, using one or more machine learning models, a set of manufacturers based on the first manufacturing parameters and the additional manufacturing parameters, wherein the one or more machine learning models have been trained to generate the set of manufacturers based on a level of uniqueness of the item to be manufactured and characteristics of the manufacturers (508). For example, processor 132 can determine, using machine learning models, an appropriate number of candidate m-members to provide in the set of results. Processor 132 can then narrow the population of candidate m-members as described above to generate the list of candidate m-members.

Process 500 continues with returning, to the user, a subset of the set of manufacturers that match the first manufacturing parameters and the additional manufacturing parameters, the subset having a number of manufacturers determined based on a level of matching between the characteristics of the manufacturers and the first manufacturing parameters and the additional manufacturing parameters for each of the manufacturers (510). For example, digital platform 130 can provide the list of candidate m-members generated by processor 132 to the user of client device 120.

Figure 6:
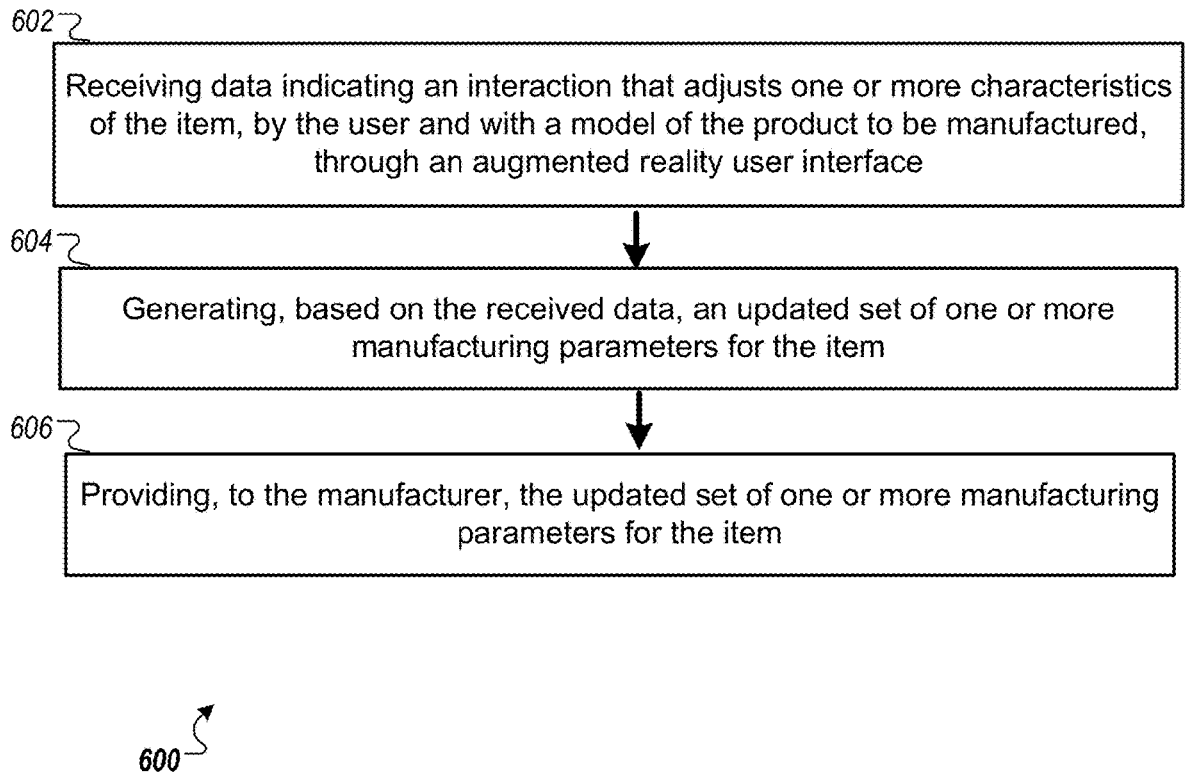
FIG. 6 is a flow chart of an example process for receiving input from a user to alter parameters of a product.

FIG. 6 is a flow chart of an example process 600 for receiving input from a user to alter parameters of a product. In some implementations, the process 600 can be implemented by a co-creation digital platform, such as digital platform 130 of system 100. In some implementations, the process 600 can be implemented as instructions stored on a non-transitory computer readable medium, and when the instructions are executed by one or more servers, the instructions can cause the one or more servers to perform operations of the process 600.

The process 600 begins with receiving data indicating an interaction that adjusts one or more characteristics of the item, by the user and with a model of the product to be manufactured, through an augmented reality user interface (602). For example, a user of client device 120 can interact with a model of a lamp to be produced by manufacturer 110 through digital platform 130. Processor 132 can receive the interaction data.

Process 600 continues with generating, based on the received data, an updated set of one or more manufacturing parameters for the item (604). For example, processor 132 can generate, based on the interaction data, updated parameters for the lamp. If a user made the lamp shorter or changed the material of the lamp base, processor 132 can generate updated parameters that reflect these changes.

Process 600 continues with providing, to the manufacturer, the updated set of one or more manufacturing parameters for the item (606). For example, digital platform 130 can provide the updated parameters to manufacturer 110. Processor 132 can also generate, for example, design drawings for the lamp based on the updated parameters and provide the drawings to manufacturer 110 to facilitate manufacturing the lamp.

Figure 7:
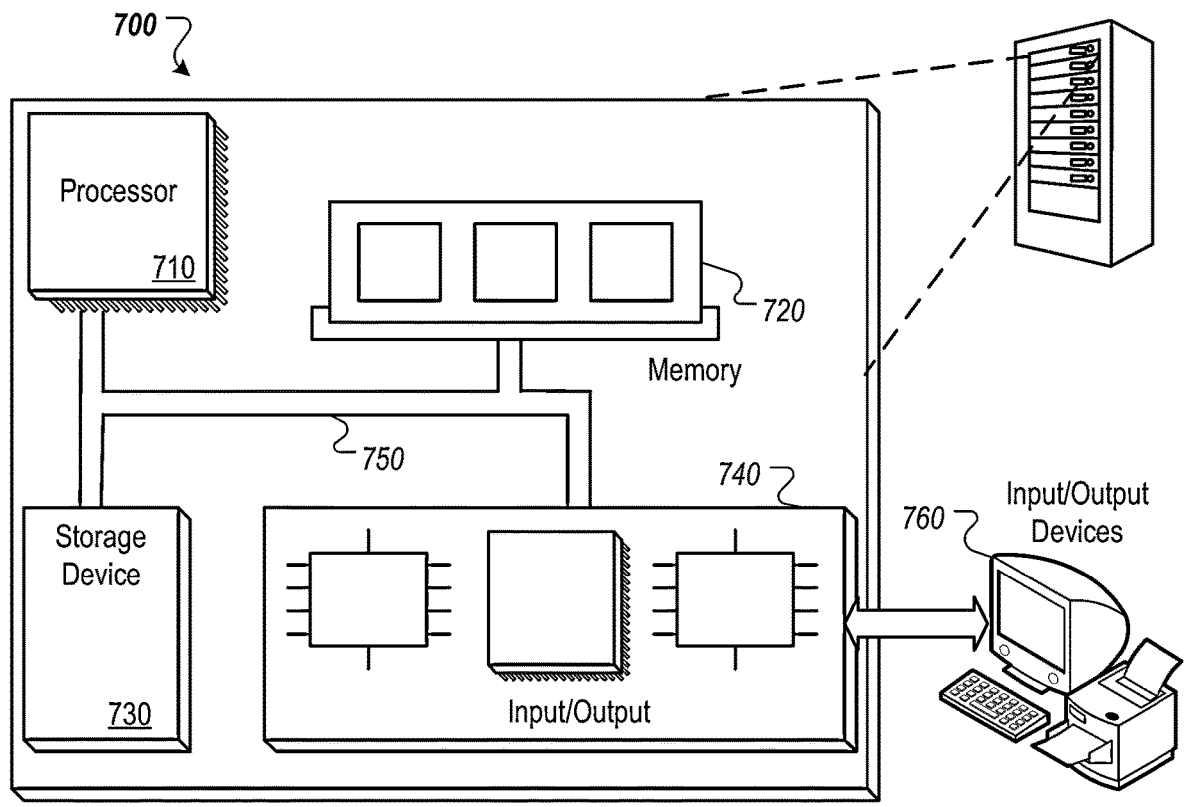
FIG. 7 is a block diagram of an example computing system.

FIG. 7 is block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 400. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving, through a user interface and from a requesting member of a digital platform, first manufacturing parameters for an item to be manufactured;
dynamically altering the user interface based on the first manufacturing parameters to include different user interface elements that correspond to a subset of attributes that are available when the item has the first manufacturing parameters, wherein the subset of attributes is fewer than all available attributes;
determining, based on interaction with the different user interface elements, additional manufacturing parameters for the item to be manufactured;
generating, using one or more machine learning models, a set of manufacturers based on the first manufacturing parameters and the additional manufacturing parameters, wherein the one or more machine learning models have been trained to generate the set of manufacturers based on a level of uniqueness of the item to be manufactured and characteristics of the manufacturers; and
returning, to the requesting member, a subset of the set of manufacturers that match the first manufacturing parameters and the additional manufacturing parameters, the subset having a number of manufacturers determined based on (i) the level of uniqueness of the item, (ii) a level of matching between the characteristics of the manufacturers and the first manufacturing parameters and the additional manufacturing parameters for each of the manufacturers, and (iii) a total number of manufacturers that match the first manufacturing parameters and the additional manufacturing parameters.

2. The method of claim 1, further comprising:
receiving data indicating an interaction that adjusts one or more characteristics of the item, by the requesting member and with a model of the item to be manufactured, through an augmented reality user interface;
generating, based on the received data, an updated set of one or more manufacturing parameters for the item; and
providing, to the manufacturer, the updated set of one or more manufacturing parameters for the item.

3. The method of claim 2, wherein the updated set of one or more manufacturing parameters for the item includes a manufacturing diagram.

4. The method of claim 2, wherein generating the updated set of one or more manufacturing parameters for the item comprises one of adding a new manufacturing parameter for the item or removing a manufacturing parameter from the first manufacturing parameters or the additional manufacturing parameters.

5. The method of claim 1, wherein determining additional manufacturing parameters for the item to be manufactured comprises automatically selecting values for the additional manufacturing parameters for the item.

6. The method of claim 1, further comprising:
receiving, through the user interface and from the requesting member, preference data indicating the requesting member's preferences of an importance of at least one parameter from the first manufacturing parameters and the additional manufacturing parameters; and
weighting, based on the received preference data, the first manufacturing parameters and the additional manufacturing parameters as input to the one or more machine learning models.

7. The method of claim 6, wherein weighting the first manufacturing parameters and the additional manufacturing parameters comprises:
determining, based on the received preference data, that the received preference data indicates the requesting member's preferences of the importance of fewer than all of the first manufacturing parameters and the additional manufacturing parameters; and
in response to the determination that the received preference data indicates the requesting member's preferences of the importance of fewer than all of the first manufacturing parameters and the additional manufacturing parameters, generating, based on historical user interaction data, a weight for each parameter of the first manufacturing parameters and the additional manufacturing parameters.

8. A system comprising:
at least one processor; and
a memory communicatively coupled to the at least one processor, the memory storing instructions which, when executed by the at least one processor, cause the at least one processor to perform operations comprising:
receiving, through a user interface and from a requesting member, first manufacturing parameters for an item to be manufactured;
dynamically altering the user interface based on the first manufacturing parameters to include different user interface elements that correspond to a subset of attributes that are available when the item has the first manufacturing parameters, wherein the subset of attributes is fewer than all available attributes;
determining, based on interaction with the different user interface elements, additional manufacturing parameters for the item to be manufactured;
generating, using one or more machine learning models, a set of manufacturers based on the first manufacturing parameters and the additional manufacturing parameters, wherein the one or more machine learning models have been trained to generate the set of manufacturers based on a level of uniqueness of the item to be manufactured and characteristics of the manufacturers; and
returning, to the requesting member, a subset of the set of manufacturers that match the first manufacturing parameters and the additional manufacturing parameters, the subset having a number of manufacturers determined based on (i) the level of uniqueness of the item, (ii) a level of matching between the characteristics of the manufacturers and the first manufacturing parameters and the additional manufacturing parameters for each of the manufacturers, and (iii) a total number of manufacturers that match the first manufacturing parameters and the additional manufacturing parameters.

9. The system of claim 8, the operations further comprising:
receiving data indicating an interaction that adjusts one or more characteristics of the item, by the requesting member and with a model of the item to be manufactured, through an augmented reality user interface;
generating, based on the received data, an updated set of one or more manufacturing parameters for the item; and
providing, to the manufacturer, the updated set of one or more manufacturing parameters for the item.

10. The system of claim 9, wherein the updated set of one or more manufacturing parameters for the item includes a manufacturing diagram.

11. The system of claim 9, wherein generating the updated set of one or more manufacturing parameters for the item comprises one of adding a new manufacturing parameter for the item or removing a manufacturing parameter from the first manufacturing parameters or the additional manufacturing parameters.

12. The system of claim 8, wherein determining additional manufacturing parameters for the item to be manufactured comprises automatically selecting values for the additional manufacturing parameters for the item.

13. The system of claim 8, the operations further comprising:
receiving, through the user interface and from the requesting member, preference data indicating the requesting member's preferences of an importance of at least one parameter from the first manufacturing parameters and the additional manufacturing parameters; and
weighting, based on the received preference data, the first manufacturing parameters and the additional manufacturing parameters as input to the one or more machine learning models.

14. The system of claim 13, wherein weighting the first manufacturing parameters and the additional manufacturing parameters comprises:
determining, based on the received preference data, that the received preference data indicates the requesting member's preferences of the importance of fewer than all of the first manufacturing parameters and the additional manufacturing parameters; and
in response to the determination that the received preference data indicates the requesting member's preferences of the importance of fewer than all of the first manufacturing parameters and the additional manufacturing parameters, generating, based on historical user interaction data, a weight for each parameter of the first manufacturing parameters and the additional manufacturing parameters.

15. A computer-readable storage device storing instructions that when executed by one or more processors cause the one or more processors to perform operations comprising:

receiving, through a user interface and from a requesting member, first manufacturing parameters for an item to be manufactured;

dynamically altering the user interface based on the first manufacturing parameters to include different user interface elements that correspond to a subset of attributes that are available when the item has the first manufacturing parameters, wherein the subset of attributes is fewer than all available attributes;

determining, based on interaction with the different user interface elements, additional manufacturing parameters for the item to be manufactured;

generating, using one or more machine learning models, a set of manufacturers based on the first manufacturing parameters and the additional manufacturing parameters, wherein the one or more machine learning models have been trained to generate the set of manufacturers based on a level of uniqueness of the item to be manufactured and characteristics of the manufacturers; and returning, to the requesting member, a subset of the set of manufacturers that match the first manufacturing parameters and the additional manufacturing parameters, the subset having a number of manufacturers determined based on (i) the level of uniqueness of the item, (ii) a level of matching between the characteristics of the manufacturers and the first manufacturing parameters and the additional manufacturing parameters for each of the manufacturers, and (iii) a total number of manufacturers that match the first manufacturing parameters and the additional manufacturing parameters.

16. The computer-readable storage device of claim 15, the operations further comprising:

receiving data indicating an interaction that adjusts one or more characteristics of the item, by the requesting member and with a model of the item to be manufactured, through an augmented reality user interface;

generating, based on the received data, an updated set of one or more manufacturing parameters for the item; and providing, to the manufacturer, the updated set of one or more manufacturing parameters for the item.

17. The computer-readable storage device of claim 16, wherein the updated set of one or more manufacturing parameters for the item includes a manufacturing diagram.

18. The computer-readable storage device of claim 16, wherein generating the updated set of one or more manufacturing parameters for the item comprises one of adding a new manufacturing parameter for the item or removing a manufacturing parameter from the first manufacturing parameters or the additional manufacturing parameters.

19. The computer-readable storage device of claim 15, wherein determining additional manufacturing parameters for the item to be manufactured comprises automatically selecting values for the additional manufacturing parameters for the item.

20. The computer-readable storage device of claim 15, further comprising:

receiving, through the user interface and from the requesting member, preference data indicating the requesting member's preferences of an importance of at least one parameter from the first manufacturing parameters and the additional manufacturing parameters; and weighting, based on the received preference data, the first manufacturing parameters and the additional manufacturing parameters as input to the one or more machine learning models.

\* \* \* \* \*